United States Patent [19]

Walsh

[11] Patent Number: 4,504,733
[45] Date of Patent: Mar. 12, 1985

[54] DRY BATH TEMPERATURE CONTROL
[75] Inventor: William J. Walsh, Dubuque, Iowa
[73] Assignee: Sybron Corporation, Rochester, N.Y.
[21] Appl. No.: 610,447
[22] Filed: May 15, 1984
[51] Int. Cl.³ ............................................. H05B 3/06
[52] U.S. Cl. .................................... 219/521; 165/185;
219/378; 219/385; 219/494; 219/530; 361/380;
422/116
[58] Field of Search ............... 219/385, 386, 401, 430,
219/432, 433, 521, 530, 540, 494; 165/76,
107.15, 185; 126/246, 375; 361/380; 422/116;
99/326, 331

[56] References Cited
U.S. PATENT DOCUMENTS

| | | | |
|---|---|---|---|
| 2,911,513 | 11/1959 | MacCracken | 219/530 |
| 2,932,718 | 4/1960 | Marsters | 219/521 |
| 3,141,948 | 7/1964 | Young | 219/494 |
| 3,381,113 | 4/1968 | Jacques et al. | 219/378 |
| 3,694,356 | 11/1971 | Havill | 219/530 |
| 3,801,278 | 4/1974 | Wagner et al. | 422/116 |
| 3,902,043 | 8/1975 | Rogan | 219/521 X |
| 3,986,082 | 10/1976 | Land | 361/380 |
| 3,989,927 | 11/1976 | Erb | 219/378 |
| 4,107,513 | 8/1978 | Ashford | 219/521 |
| 4,342,903 | 8/1982 | Hoogstoel | 219/386 |

Primary Examiner—Volodymyr Y. Mayewsky
Attorney, Agent, or Firm—Robert A. Gerlach; Joseph C. MacKenzie

[57] ABSTRACT

An electrically-heated dry bath wherein a metal block having receptacles for receiving test tubes or the like has resistor heaters fixed thereto and a thermistor temperature sensor therein. A control circuit is provided which connects and disconnects electrical current to and from said heaters in response to the temperature sensor. The control current is fedback such as to eliminate a factor $J(S)$ from the overall transfer function of the circuit, $J(S)$ being a transfer function expressing how various thermal time constants in the bath would, unless neutralized, make the effective time constant of the controlled system deviate from the ideal on-off transfer function.

16 Claims, 6 Drawing Figures

DRY BATH TEMPERATURE CONTROL

FIELD OF THE INVENTION

The field of the invention is the electrical heating of objects, such as test tubes, by means of a heated block having receptacles containing the tubes.

PRIOR ART BACKGROUND

Applicant's assignee's Thermolyne division has for some years commercially manufactured a series of dry baths differing from the dry bath described and claimed herein only in respect of the manner of and control circuitry for controlling temperature.

The main object of the present invention is to provide dry baths, such as are referred to above, with temperature control circuitry having the improvement wherein the said circuitry is fedback such that the system comprised of the essential dry bath structure, inclusive of heater resistors and temperature sensor, and in combination with the control circuitry and a source of electrical energy, cooperate such that a test tube, or several test tubes, or the like, reposing in receptacles provided by said dry baths, are thereby immersed in a temperature milieu of extreme stability, viz., the temperature is controlled to a hundredth or so of a Celsius degree.

SUMMARY OF THE INVENTION

Briefly, according to the present invention, the temperature control circuitry of the dry bath is fedback in accordance with a transfer function J(S), such that the overall controlled system operates as if it were ideal. In this case, the circuitry is basically on-off, so that the effective transfer function appears to be $1/(1+T_1 S)$, wherein $T_1$ is the single time constant for an actual system, and S is the Laplace operator.

DESCRIPTION OF THE PREFERRED EMBODIMENT OF THE INVENTION

Figure 1:
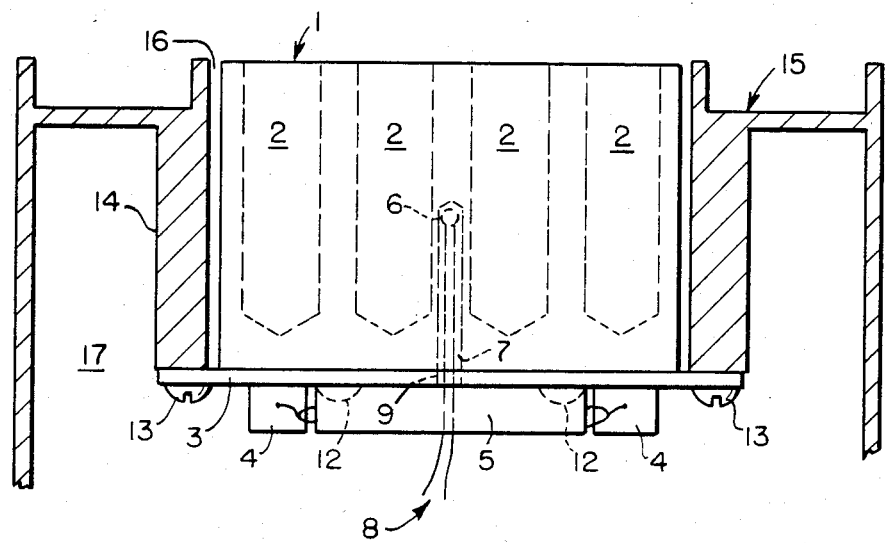
FIGS. 1, 2 and 3 are respective side elevations, partly in section, and a bottom plan view, of dry bath structure typical of the commercial series of dry bath referred to above.
Figure 2:
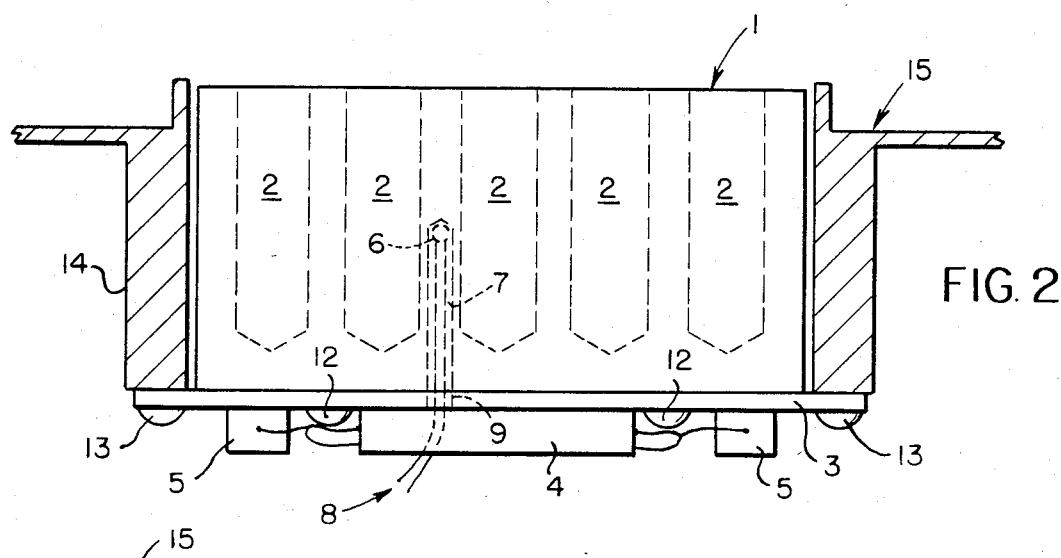

The main thermal mass of the dry bath according to my invention is a block 1, having various receptacles therein in the form of cylindrical bores, which may be alike as indicated, the reference numeral 2 therefore being used to denote each such bore. The bores 2 terminate short of the bottom of the block, such bottom being flat and having flat support plate 3 in as close contact as possible to minimize the effect of the interface between block 1 and plate 3 on heat transfer from plate 3 to block 1.

In turn, on plate 3 are heater resistors 4 and 5, these being dimensionally alike, save as to resistance values. Resistors 4 and 5 also seat flat on plate 3, in as intimate as possible contact with the plate in order to facilitate heat transfer from the resistors to the plate 3. The resistors are located at the edges of the block so as to minimize edge-effects and to improve uniformity of heat distribution in said block. Suitable heat sink compound or heat-conductive adhesive, or the like, may be used between plate and resistors, and between block and plate, whereby to optimize thermal conductivity from resistors to block, and to improve uniformity of heat distribution.

In a roughly central position in block 1 is a temperature sensor, for instance, a thermistor 6 at the upper end of a bore 7 drilled into block 1 from the bottom thereof. The thermistor is caused to intimately thermally contact the end of bore 7 by means of heat sink compound (not shown) so as to as nearly as possible assure that the thermistor be at the same temperature as the next adjacent surrounding portion of the material of the block 1.

For connection to control circuitry, later to be described, thermistor 6 has leads 8 which emerge from well 7 through hole 9 in plate 3. Resistors 4 and 5 have leads 10 and 11, respectively, for connection to a source of electrical power.

Screws 12 draw plate 3 tightly against block 1, and screws 13 fix plate 3 to surrounding inner wall 14 of outer casing structure 15 of the dry bath, the plate thereby dividing the interior space of structure 15 into parts 16 and 17, of which the former receives block 1 with a slight clearance, and the latter receives the control circuitry (shown in FIG. 4), and other dry bath elements (not shown here, as they are not relevant).

The sketches are to scale of a 20-receptacle, aluminum block, of which the dimensions, in inches, are 2, 3 and 4, plate 3 being 11 gauge aluminum, and the resistors 4 and 5 being commercially available TRW type PW-10, which are connected to plate 3 with silicon rubber or the like.

Figure 4:
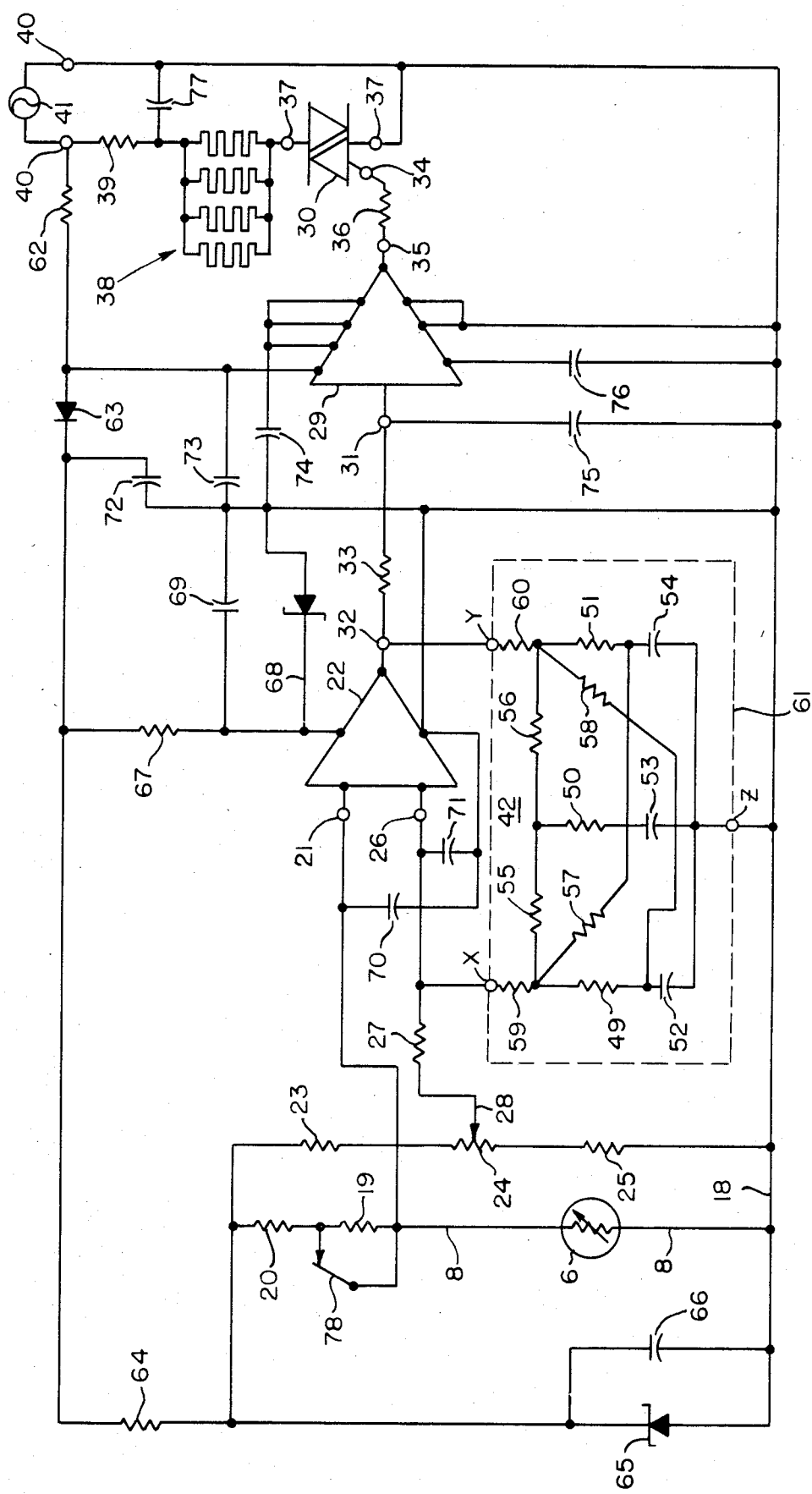
FIGS. 4 and 5 are respectively a sketch of my novel control circuitry, and of a modification thereof.

Turning to FIG. 4, thermistor 6 is shown as having one of its leads 8 connected to circuit common 18 of the control circuit, and to two other resistors 19 and 20, forming therewith a half-bridge connected to terminal 21 of the non-inverting input of an operational amplifier-comparator or "op-amp" 22. A reference half-bridge made up of resistors 23, 24 and 25 in series, and connected to terminal 26 of the inverting input of amplifier-comparator 22, such connection being made via a resistor 27 which is adjustably connected to an intermediate point of resistor 24 by a movable tap 28 of resistor 24.

The output of the op-amp 22 feeds a switching device, preferably a zero voltage switch 29 which, in turn, drives a thyristor 30, switch 29 having its input terminal 31 connected to the output terminal 32 of op-amp 22 via resistor 33.

Thyristor 30 has a gate terminal 34 connected to the output terminal 35 of switch 29 via resistor 36, the other two thyristor terminals 37 connecting the thyristor 30 in series between the parallel resistance combination 38 (which represents the four resistors 4 and 5, of FIG. 3), the circuit common 18, parallel resistance combination 38 being connected in series with a wire wound resistor 39, which in turn connects the combination 38 to one terminal 40 of an AC power source 41, 117 volts nominal, for energizing the resistors 4 and 5, source 41 having its other terminal 40 connected to circuit common 18.

The circuitry I have described thus far, with the dry bath structure's mass, forms a closed loop system which could fairly well maintain the temperature of block 1 at some desired steady or constant value, as will be apparent to those skilled in the art. Thus, it is well-known that a control system having a single time constant, generally associated with the process variable, is stable regardless of the magnitude of gain of the control system.

This is because there is only one "storage tank" for energy in the system, eliminating the primary cause of instability—energy transfer (as a function of time) from one "storage tank" to another as in systems having secondary time constants. Therefore, with a single time constant system, even a simple ON/OFF controller is extremely stable. However, to approach this condition in a dry bath, the entire thermal system must resemble a single mass. This means that the thermal resistance between the heating elements and the block and also between the block and the temperature sensor must be very low. Even though this requirement be maximally fulfilled, there is still some thermal resistance to contend with, as well as other difficulties, for example, the thermal diffusivity of the aluminum block—that is, the finite heat transmission time through the aluminum because of its distributed thermal resistance and thermal mass. As a result, a structure like the present dry bath will exhibit secondary time constants, in addition to a primary time constant due to the heat capacity of the block.

According to my invention, by building in a complementary transfer function in the forward part of an on-off closed-loop control system containing the dry bath, the effects of these secondary time delays can be cancelled out so that the system will seem to have but a single time constant.

According to the present invention, the process variable is considered to have a primary transfer function of the form $1/(1+T_1S)$, modified by a secondary transfer function, such as heat transmission through the aluminum block, so as to give an overall transfer function of the form $(1/(1+T_1S))J(S)$ where $T_1$ represents the primary time constant, and $J(S)$ is a secondary transfer function. Then, by also including a transfer function of the form $1/J(S)$ in the forward transfer loop, the modifying secondary function in effect will be cancelled, so that, as previously stated, the system will seem to have but a single constant. $J(S)$ represents one secondary time constant or more.

In terms of present FIG. 4, op amp 22 is provided with a very high gain, K, and is in the forward loop and fedback through an electrical network 42 having the transfer function $J(S)$. Accordingly, the forward transfer function of this combination will be $K/(1+KJ(S))$, but since the gain, K, is very high, the transfer function of this combination will be closely equal to $1/J(S)$, because, as is well known, $K/(1+KJ(S))$ approaches $1/J(S)$ as K becomes large.

Due to the nature of the dry bath, the secondary transfer function will be of the form $1(1+(T/n)S)^n$. I have found that feedback circuits comprising RC sections 42 in the reverse loop of the op amp 22, is sufficient to approximate this function. Thus, for $n=2$, i.e. $1/(1+T_2S)^2$, two RC sections would suffice. However, adding a second function $(1+T_3S)/(1+T_4S)$, to the reverse loop seems to improve operation. The number n corresponds to the number of secondary time constants and can be rather larger than 2.

Figure 6:
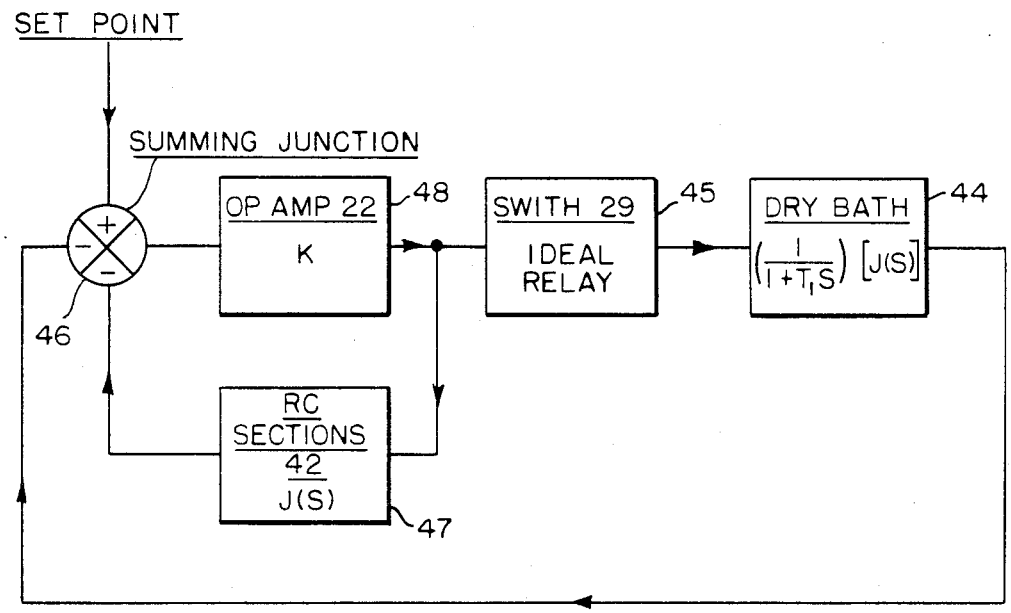
FIG. 6 is a block diagram useful for illustrating principles of the invention.

The foregoing is epitomized by FIG. 6, wherein the labeling of the boxes makes the diagram self-explanatory (N.B., the thyristor 30, and heater circuit and sensor, may be lumped in switch 29, and the dry bath, respectively, so have not been separately depicted.) In any event, as indicated by the arrow heads on the lines, representing signal paths, the dry bath is the source of a temperature signal corresponding to the transfer function in box 44. This signal is in response to the electrical energy delivered to the dry bath by the thyristor 30 under control of switch 29, which, as indicated by the legend IDEAL RELAY in box 45, simply turns the electrical power on or off, without hysteresis.

Switch 29 is ultimately under control of the output of SUMMING JUNCTION, denoted by the reference numeral 46, which receives three signals, namely, the previously mentioned temperature signal, a SET-POINT SIGNAL representing the desired value of dry bath temperature, and a feedback signal of the form $J(S)$, represented as coming from box 47 labeled RC SECTIONS 42 $J(S)$.

This feedback signal, of course, represents what op amp 22 having gain K, represented by similarly-labeled box 48, and fedback by the RC sections 42, does to the error signal in the signal connection between summing junction 46 and box 48. This feedback signal originates ultimately in the signal connection between boxes 45 and 48, from whence it is applied to box 47 which operates on it to make it approximate $J(S)$.

RC sections 42 of FIG. 4 include resistors 49, 50, and 51, each being connected to circuit common 18 via respective capacitors 52, 53 and 54. A resistor 55 interconnects resistors 49 and 50, and a resistor 56 interconnects resistors 50 and 51. A resistor 57 interconnects the junction of resistors 49 and 55 with the junction of capacitor 54 and resistor 51, and a resistor 58 interconnects the junction of resistors 51 and 56 with the junction of capacitor 52 and resistor 49. And, finally, resistors 59 and 60 couple the junctions of resistors 49, 55 and 57, and the junction of resistors 51, 56, and 58, respectively, to the junction between resistance 27 and op-amp input terminal 26, and to the junction between resistance 33 and op-amp output terminal 32.

The RC sections 42 are collectively indicated as the content of a dashed-line box 61 having terminals X, Y and Z representing the above described interconnection of RC sections with op amp 22 input and output, and with circuit common 18.

The RC sections shown in box 61 has been empirically determined to have the transfer function $J(S)$. Furthermore, the kind of secondary time constants necessarily possessed by the dry bath do have RC section analogs and it would be expected that it would require as many RC sections as time constants. The empirical test is that the circuit shown in FIG. 4 has been found to regulate the temperature of the dry bath described herein to either 30.00° C. or 37.00° C., as desired, in each case, to plus or minus 0.01°–0.02° C.

Figure 5:
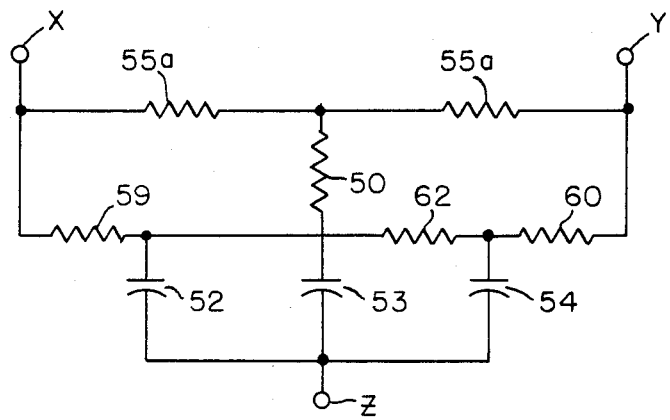

Furthermore, the same results were obtained by means of the FIG. 5 version of RC sections 42, for which the transfer function can be derived by inspection, namely, it is $[1(1+T_2S)^2+(1+T_3S)/(1+T_4S)]$. The FIG. 5 version differs from that shown in box 61, in that resistors at places corresponding to 57, 58, 59 and 60 are lacking, and resistor 62, interconnecting the off-common sides of capacitors 52 and 54 has been added. Again, resistors 59 and 60 have replaced resistors 49 and 51, and resistors 55 and 56 have been increased in value, and hence designated in FIG. 5 as 55a and 56a, respectively.

The use of the RC sections of FIG. 5 is of course, to replace RC sections 42 of FIG. 4 bodily, in respect of connection to terminals X, Y and Z.

To sum up, to a good first approximation, there is one time constant effected by the thermal capacity of the block and associated components (heating elements and sensor), plus the rate of heat loss to ambient (thermal resistance). This is analogous to a parallel RC combination fed by a constant current source.

However, the first approximation is modified by a number of other factors, such as the distributed nature of the thermal resistivity and thermal capacity of the block between the heating elements and sensor (these are the parameters which determine the factor sometimes called thermal diffusivity).

In addition, the fact that the materials are not thermally homogeneous will create some additional minor lumped time constants. (E.g., the resistors do not have the same thermal characteristics as aluminum).

These time constants are, of course, closely coupled to each other. Because of this coupling, and because of the irregular path of heat flow, it would be very difficult indeed to theoretically predict the precise transfer function. Therefore, I take the first or primary approximation as $G(S)=1/(1+T_S)$ which is modified by some secondary function J(S) into which all of these other factors are grouped. The overall transfer function of this part of the system is, then, G(S)J(S).

As it appears that the distributed constants of the block play the most important role in this modifying function J(S), the feedback for the forward loop, (i.e., op-amp 22, switch 29) should approximate a distributed time constant, which can be done by using 2 or more RC sections.

The power for the control circuit is obtained from source 41 via resistor 62 and diode 63 feeding the thermistor bridge through resistor 64. Additional stability for the bridge is provided by Zener diode 65, bypassed by capacitor 66. Op-amp 22 is fed from diode 63 via resistor 67, with additional stabilization from Zener diode 68, bypassed by capacitor 69. Op-amp 22 also has its terminal 4 (manufacturer's reference number) connected to circuit common 18, and both of its inputs bypassed by capacitors 70 and 71 to circuit common 18 via terminal 4 (manufacturer's reference number).

The RCA CA 3059 has internal Zener diode stabilization which also helps stabilize the rectified voltage output of diode 63, and as well regulates the AC waveform to 8 volts, peak to peak. The output of diode 63 is filtered by capacitor 72. Capacitor 73 is connected to the Zener diode stabilized terminal 5 (manufacturer's reference number) of the RCA CA 3059, and bypasses the terminal to circuit common 18. Capacitor 74 bypasses terminals 9, 10 and 11 (manufacturer's reference numbers) of the RCA CA 3059, to circuit common 18. Terminal 13 (manufacturer's reference number) is bypassed to circuit common by capacitor 75 and capacitor 76 is recommended by the manufacture of the CA 3059.

A capacitor 77, between circuit common 18, and the junction between resistor combination 38 and wire-wound resistor 39, with the latter's resistance and inductance, provides an RLC filter which attenuates high frequency transients from the power line.

It is to be observed that the thermal energy being controlled is quite low level, so that not much electrical power is being handled either by the heating resistance or by the control circuit. Thus, the former is required to hold the articles heated in receptacles 2 at 30° or 37° C., depending on whether shorting switch 78 across resistor 19 is closed or open, and so some 15 watts will do, whereas the latter requires about an order less power, so, consequently, in operation the entire system of FIG. 4 demands about 16 watts from source 41.

On the other hand, the stability requirement, 0.01 C.°, is quite rigorous, and I find it quite surprising that it can be fulfilled as straightforwardly as does the circuit of FIG. 4, or that circuit modified by substituting in it the circuit of FIG. 5. Within the range from about 85 volts to 130 volts to 130 volts from source 41, stability was degraded only to about 0.03 C.°.

Such stability requires careful attention to stabilizing the power supply for the bridge, op-amp 22 and switch 29, and bypassing and local feedback for various terminals, in order to eliminate electrical transients and noise. Expectable ambient air temperature fluctuations of a typical laboratory environment have been found not to degrade thermal stability, though, of course, in practice, the dry-bath can have a cover (not shown) over the upper side of block 1, which would keep ambient air currents away from the receptacles 2, thereby preventing them from directly affecting the temperature of the articles in the receptacles, e.g., test tubes containing biological materials being incubated, etc.

The chosen op-amp 22 has an FET input, so, as opposed to a bipolar input type of device, any voltage error due to current flow through bridge resistance will be very small and hence cause substantially no error if temperature of the op-amp varies. Where op-amp temperature is not a factor, there are suitable bipolar input devices which otherwise are on a par with the FET input devices for error. It is not just a question of input error in the op-amp, but also stability of that error is important.

The parts list, to follow hereinbelow, will provide a circuit 4 which achieves the advantageous results I describe herein. Resistor values are given in kilohms, ohms, and megohms, watt ratings being usually not given, since except as otherwise indicated low-wattage, 10% tolerance, composition resistors are satisfactory. Signal voltage levels are also low, so only power supply bypass capacitors have specified voltage ratings, and 20% tolerance will do. Parts identified by manufacturers' designation were carefully chosen, but substitutions thereof are possible of other manufacturers' devices having corresponding specifications.

Figure 3:
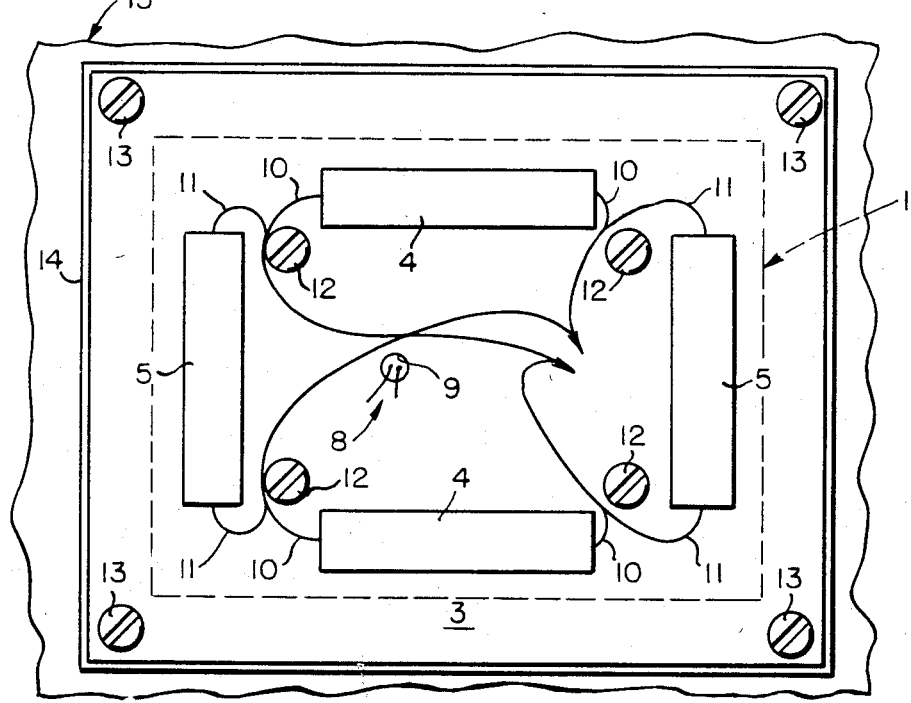

| LIST OF PARTS FOR FIGS. 3 AND Y: | | |
|---|---|---|
| Resistors | 4 | 3.3K, each |
| Resistors | 5 | 4.5K, each |
| Thermistor | 6 | |
| (Yellow Springs Instrument No. 4408, 30K at 25° C.) | | |
| Resistor | 19 | 18.2K (metallized, for stability) |
| Resistor | 20 | 6K (metallized, for stability) |
| Resistor | 23 | 17.4K (metallized, for stability) |
| Resistor | 24 | 1K (wire wound potentiometer) |
| Resistor | 25 | 17.4K (metallized, for stability) |
| Resistor | 27 | 11.3K |
| Resistor | 33 | 49.9K |
| Resistor | 36 | 0.47K |
| Resistor | 39 | 20 ohms, wire-wound |
| Resistor | 49 | 200K |
| Resistor | 50 | 100K |
| Resistor | 51 | 200K |
| Resistor | 55 | 1 megohm |
| Resistor | 55a | 2 megohm |
| Resistor | 56 | 1 megohm |
| Resistor | 56a | 2 megohm |
| Resistor | 57 | 1 megohm |
| Resistor | 58 | 1 megohm |
| Resistor | 59 | 499K |
| Resistor | 60 | 499K |
| Resistor | 62 | 4K 10 watt |
| Resistor | 64 | 2.8K |
| Resistor | 67 | 2.8K |
| Capacitor | 66 | 100 mfd, 16V. |
| Capacitor | 69 | 100 mfd, 16V. |
| Capacitor | 70 | 0.01 mfd |
| Capacitor | 71 | 0.01 mfd |

-continued

| LIST OF PARTS FOR FIGS. 3 AND Y: | | |
|---|---|---|
| Capacitor | 72 | 100 mfd, 16V. |
| Capacitor | 73 | 0.1 mfd |
| Capacitor | 74 | 22 mfd, 16V. |
| Capacitor | 75 | 3.3 mfd, 16V. |
| Capacitor | 76 | 100 mfd, 16V. |
| Op-amp | 22 | RCA CA 3130 |
| Switch | 29 | RCA CA 3059 |
| Thyristor | 30 | RCA T 2300 |
| Diode | 63 | |
| Diode | 65 | 6.8V. |
| Diode | 68 | 6.8V. |
| Switch | 78 | shorting-switch |

I incorporate herein by reference, pages 127 through 131, 218 through 227, and pages 542, 543, and 544 of "RCA Solid State Linear Integrated Circuits", SSD 240A, Copyright 1978, RCA.

The principle in devising the J(S) feedback circuit for op-amp 22 is to use multiple RC sections, as in FIG. 4 and in FIG. 5. Useful deviations from the particulars herein shown are obviously derivable both on an empirical basis and a theoretical basis, hence would be covered by the claims hereinbelow.

Having set forth my invention in accordance with 35 USC 112, I claim:

1. The method of controlling a thermal load as if it were a thermal mass having a single time constant, comprising the steps of
    (a) providing said load in the form of a block, said block incorporating one or more receptacles for an object or objects to be heated and having a temperature sensor and electrical resistance heating means for heating said block;
    (b) sensing an actual temperature at some position in said block by locating said sensor in close thermal association with said block at said position for providing a signal representing said actual temperature and determining the relationship between said actual temperature and a desired temperature of said block;
    (c) connecting and disconnecting said heating means to and from a source of electrical current, depending on said relationship, for causing heat to be transferred from said heating means to said position in block in accordance with the transfer function $1/(1+T_1S)$ by modifying such connecting and disconnecting in accordance with the function J(S), wherein
    $T_1$ = the primary time constant of said thermal load,
    S = the Laplace operator, and
    J(S) = the transfer function for one or more secondary time constants of said thermal load.

2. The method of claim 1 wherein the transfer function J(S) is of the form $1/(1+(T/n)S)^n$.

3. The method of claim 1 wherein the transfer function J(S) is approximated at least in part by $1/(1+T_2S)^2$ wherein $T_2$ is a secondary time constant of said thermal load.

4. The method of claim 3 wherein the transfer function J(S) also includes $(T_3S+1)/(T_4S+1)$, in addition to $1/(1+T_2S)^2$, and $T_3$ and $T_4$ are also secondary time constants of said thermal load.

5. The method of claim 2 wherein the transfer function J(S) is approximated by $((1/(1+T_2S)^2+(T_3S+1)/T_4S+1))$, wherein $T_2$, $T_3$ and $T_4$ are secondary time constants of said thermal load.

6. The method of claim 1, wherein said relationship is determined by summing said signal with a second signal representing said desired temperature whereby to produce a third signal representative of the result of such summing, and including the steps of:
    (d) providing a fourth signal representative of J(S) and
    (e) modifying said third signal with said fourth signal to remove therefrom the effect of J(S) to cause said third signal to be such that heat is transferred to said position in said block in accordance with the transfer function $1/(1+T_1S)$.

7. The method of claim 2, wherein said relationship is determined by summing said signal with a second signal representing said desired temperature whereby to produce a third signal respresentative of the result of such summing, and including the steps of:
    (d) providing a fourth signal representative of J(S) and
    (e) modifying said third signal with said fourth signal to remove therefrom the effect of J(S) to cause said third signal to be such that heat is transferred to said position in said block in accordance with the transfer function $1/(1+T_1S)$.

8. The method of claim 3, wherein said relationship is determined by summing said signal with a second signal representing said desired temperature whereby to produce a third signal representative of the result of such summing, and including the steps of:
    (d) providing a fourth signal representative of J(S) and
    (e) modifying said third signal with said fourth signal to remove therefrom the effect of J(S) to cause said third signal to be such that heat is transferred to said position in said block in accordance with the transfer function $1/(1+T_1S)$.

9. The method of claim 4, wherein said relationship is determined by summing said signal with a second signal representing said desired temperature whereby to produce a third signal representative of the result of such summing, and including the steps of:
    (d) providing a fourth signal representative of J(S) and
    (e) modifying said third signal with said fourth signal to remove therefrom the effect of J(S) to cause said third signal to be such that heat is transferred to said position in said block in accordance with the transfer function $1/(1+T_1S)$.

10. The method of claim 5, wherein said relationship is determined by summing said signal with a second signal representing said desired temperature whereby to produce a third signal representative of the result of such summing, and including the steps of:
    (d) providing a fourth signal representative of J(S) and
    (e) modifying said third signal with said fourth signal to remove therefrom the effect of J(S) to cause said third signal to be such that heat is transferred to said position in said block in accordance with the transfer function $1/(1+T_1S)$.

11. In an electrical heater having a primary time constant and one or more secondary time constants, said heater comprising a heat-conductive block of material having receptacles therein for receiving articles to be heated, a temperature sensor in said block, electrical heating resistance attached to said block for heating said block, and a control circuit for connecting and disconnecting electrical current, in response to a control signal, to and from said electrical heating resistance, depending on the relationship of the actual value of temperature sensed by said sensor to a desired value of said temperature, the improvement wherein said control circuit has connected thereto input means and fedback means, said input means including said sensor for applying to said fedback means a deviation signal representing the magnitude of the deviation between said values; said fedback means producing said control signal and including feedback circuitry effectively connected to said control signal to produce a feedback signal representing J(S), wherein J(S) is a transfer function solely of the said heater's secondary time constant or constants.

12. The invention of claim 11 wherein the transfer function J(S) is of the form $1/(1+(T/n)S)^n$.

13. The invention of claim 12 wherein the transfer function J(S) is approximated by $((1/(1+T_2S)^2+(T_3S+1)/(T_4S+1))$, wherein $T_2$, $T_3$ and $T_4$ are secondary time constants of said heater.

14. The invention of claim 11 wherein the transfer function J(S) is approximated at least in part by $1/(1+T_2S)^2$, wherein $T_2$ is a secondary time constant of said heater.

15. The invention of claim 14 wherein the transfer function J(S) also includes $T_2S+1$, in addition to $(T_3S+1)/(T_4S+1)$, and $T_3$ and $T_4$ are also secondary time constants of said heater.

16. A system for controlling temperature of a thermal mass, said system including heating means, energy supplying means, and control means, said heating means being arranged to heat said thermal mass substantially uniformly in response to energy supplied to said heating means by said energy supplying means; said system also including control means for connecting and disconnecting said heating means from said energy supplying means, depending on the relationship of the value of an actual temperature of said thermal mass, to the desired value of temperature of the said thermal mass; said control means including fedback circuitry and input means, said input means being responsive to said actual temperature for producing an error signal representing of said relationship, and said fedback circuitry being connected to said input means and responsive to said error signal for producing therefrom a control signal which connects to said control means and causes the latter to connect said energy supplying means to said heating means when said error signal is of such character as to indicate that said value of an actual temperature is less than said desired value; said fedback circuitry having a feedback loop connected to said control signal for converting it to a modified signal and applying said modified signal to said input means for opposing said error signal: said modified signal having a transfer characteristic such as to modify production of said control signal for causing the system to heat said thermal mass as if in accordance with a transfer characteristic having a single primary time constant, by simultaneously cancelling from said control signal any component therein which is due to any secondary time constant or constants, characteristic of heat transfer relations due to parameters of said system.

* * * * *